April 24, 1934.  I. A. MORRIS  1,956,157

FLOW LINE

Filed July 16, 1931

Inventor
Ira A. Morris

By Hardway Cathey
Attorneys

Patented Apr. 24, 1934

1,956,157

UNITED STATES PATENT OFFICE 1,956,157

FLOW LINE

Ira A. Morris, Liberty, Tex.

Application July 16, 1931, Serial No. 551,120

1 Claim. (Cl. 166—2)

This invention relates to a novel type of flow line.

One object of the invention is to provide a flow line for wells such as oil wells which will permit the free flow of the oil from the well and at the same time will prevent the escape of gas from the well.

Another object of the invention is to provide a flow line for wells of the character described having an inflow opening beneath the normal level of the oil in the well with a float operated valve arranged to control said opening to the end that when the opening is submerged beneath the said level the valve will remain in open position to permit the flow of fluid from the well through said flow line but when said level is lowered beneath the opening the valve will operate to close said opening.

A further feature of the invention resides in the provision of a flow line of the character described in combination with pipe or casing in a well of such construction that the gas will be trapped and prevented from escaping from the well but the liquid will be permitted to freely flow through said line from the well.

With the above and other objects in view, the invention has particular relation to certain novel features of construction, operation and arrangement of parts, an example of which is given in this specification and illustrated in the accompanying drawing, wherein.

Figure 1:
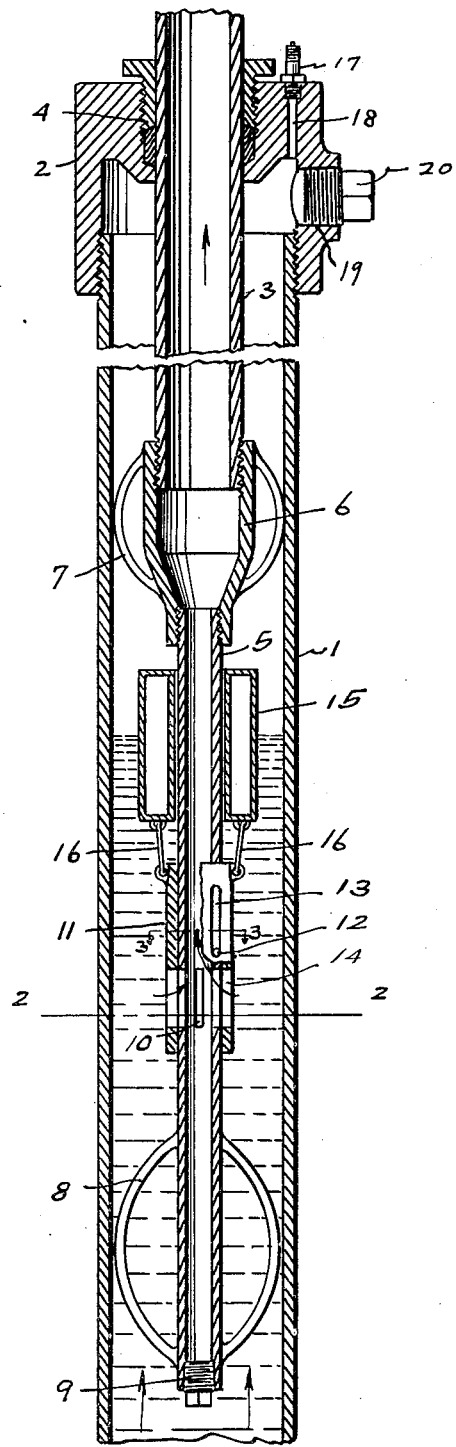
Figure 1 shows a vertical sectional view of the device.
Figure 2:
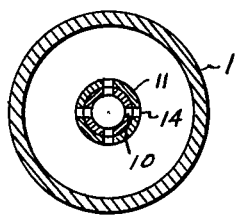
Figure 2 shows a cross sectional view taken on the line 2—2 of Figure 1.
Figure 3:
Figure 3 shows a sectional view taken on the line 3—3 of Figure 1.

Referring now more particularly to the drawing, wherein like numerals of reference designate similar parts in each of the figures, the numeral 1 designates a casing set in a well bore. This casing has a suitable head 2 connected to the top thereof and the flow line 3 extends down through the casing into the well, there being a stuffing box in the casing head around the flow line to form a fluid tight joint. If desired, the lower section 5 of the flow line may be reduced and connected to the upper portion thereof by means of a reducing nipple 6 and the flow line is held centered in the casing by means of upper and lower guides 7, 8. The lower end of the flow line may be closed in any suitable manner as by a plug 9.

The reduced section 5 of the flow line has one or more openings as 10, which are submerged beneath the normal level of the fluid rising in the casing 1. On the reduced lower end of the flow line there is a slidable sleeve valve 11 whose range of movement is limited by a stop 12 which is connected to said flow line and which works through a vertical slot 13 in the valve. This valve has openings 14 corresponding to the openings 10 and movable into and out of registration therewith. Around the flow line and movable thereon there is a hollow sleeve like float 15, located above the valve and connected thereto in any suitable manner as by links 16. This float rides up and down as the level of the fluid in the casing varies. When the openings 10 are uncovered by the valve the oil may flow in through the openings 14 and 10 and on up through the flow line to the ground surface due to the internal pressure of gas in the well. The gas, however, will be trapped in the casing above the wall and the gas pressure thus maintained in the well to the end that the internal pressure in the well will not be reduced materially and to the further end that the gas in the well will not escape with the oil and become intermingled therewith so that the oil flowing out will not have to be treated in order to remove the gas therefrom.

Sometimes there is sufficient gas pressure within the well to maintain a constant flow of the oil in the well through the flow line. At other times the well flows by heads, that is flows intermittently due to the fact that there is not sufficient pressure to keep up the flow. When a well flows intermittently the level of the oil in the casing will vary, the level becoming lower as the oil flows out. With the type of apparatus herein described, when the level of the oil descends, the float 15 will descend with it so as to close the openings 10 to prevent said openings from becoming uncovered when not submerged in the oil to the end that when the oil level in the well is beneath the openings 10, said openings will be closed by the valve and the gas prevented from escaping.

At times it may be found desirable to increase the gas pressure in the well and for that purpose a pump connection as 17 has been provided and attached to the head 2 whereby air may be forced under pressure through the inlet conduit 18 until the desired pressure is restored in the well. This connection is provided with the conventional type of back pressure valve to prevent the escape of the pressure fluid from the well.

The casing head 2 is provided with an opening 19 normally closed by a plug 20. If it be desired to relieve the gas pressure from the well for the purpose of utilizing the gas the plug 20 may be removed for that purpose.

The drawing and description disclose what is now considered to be a preferred form of the invention by way of illustration only while the broad principle of the invention will be defined by the appended claim.

What I claim is:

The combination with a casing in a well of a single flow line extending down into said casing and whose lower end is closed and submerged in the liquid in the well, means for closing the space between the upper end of the casing and the flow line to form a gas trap in the upper end of the casing, said flow line having an inlet opening in the side thereof above the closed end, and beneath said trap through which the accumulated gas in said trap may force the liquid in the well into said flow line, means affected by the level of the liquid in the well and arranged to open and close said opening, said means being arranged to be maintained open when said liquid is at normal level and being arranged to move toward closed position as the level of the liquid is lowered beneath said normal level.

IRA A. MORRIS.